(12) United States Patent
Singleton et al.

(10) Patent No.: US 6,230,360 B1
(45) Date of Patent: May 15, 2001

(54) BAKED GOOD PAN CLEANER

(76) Inventors: Scott Singleton, 617 Holtords Prairie #1015, Lewisville, TX (US) 75056; Chris Goddard, 1643 Juniper La., Lewisville, TX (US) 75057

( * ) Notice: Subject to any disclaimer, the term of this patent is extended or adjusted under 35 U.S.C. 154(b) by 0 days.

(21) Appl. No.: 09/387,386

(22) Filed: Sep. 2, 1999

Related U.S. Application Data

(60) Provisional application No. 60/098,879, filed on Sep. 2, 1998.

(51) Int. Cl.[7] ................................ A47L 5/38; A47L 7/02

(52) U.S. Cl. ......................... 15/309.2; 15/308; 15/345

(58) Field of Search .................................. 15/308, 309.2, 15/345

(56) References Cited

U.S. PATENT DOCUMENTS

| | | | | |
|---|---|---|---|---|
| 2,629,343 | * | 2/1953 | Rose | 15/308 |
| 4,044,420 | * | 8/1977 | Hanson | 15/309.2 |
| 4,403,365 | * | 9/1983 | Hanson | 15/309.2 |
| 4,670,936 | * | 6/1987 | Hanson | 15/309.2 |

* cited by examiner

*Primary Examiner*—Robert J. Warden, Sr.
*Assistant Examiner*—Theresa T. Snider
(74) *Attorney, Agent, or Firm*—Jackson Walker LLP

(57) ABSTRACT

A bun pan cleaner having a pair of counter rotating brushes for scrubbing the bottom of the baking pan. The bun pan cleaner also includes one air jet, under a hood, for directing compressed air under the surface of the pans to help blow seeds and other debris into the air beneath the hood for evacuation. There is also one or more augers beneath the hood which, when rotated will help sweep seeds and other debris out from under the hood.

14 Claims, 20 Drawing Sheets

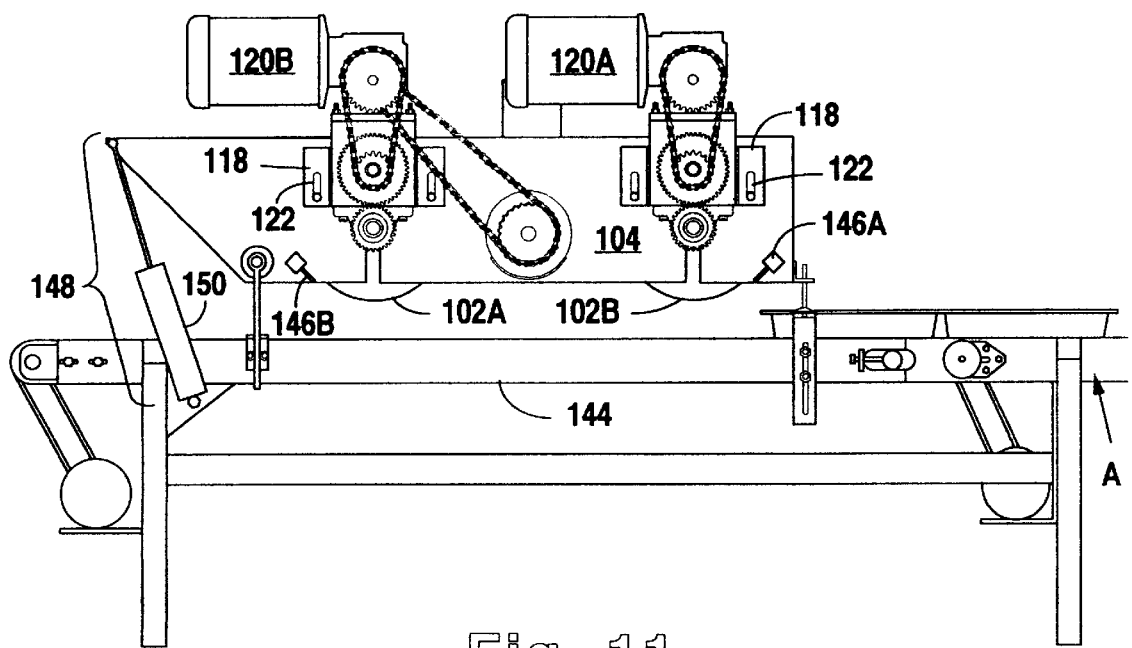
Fig. 11
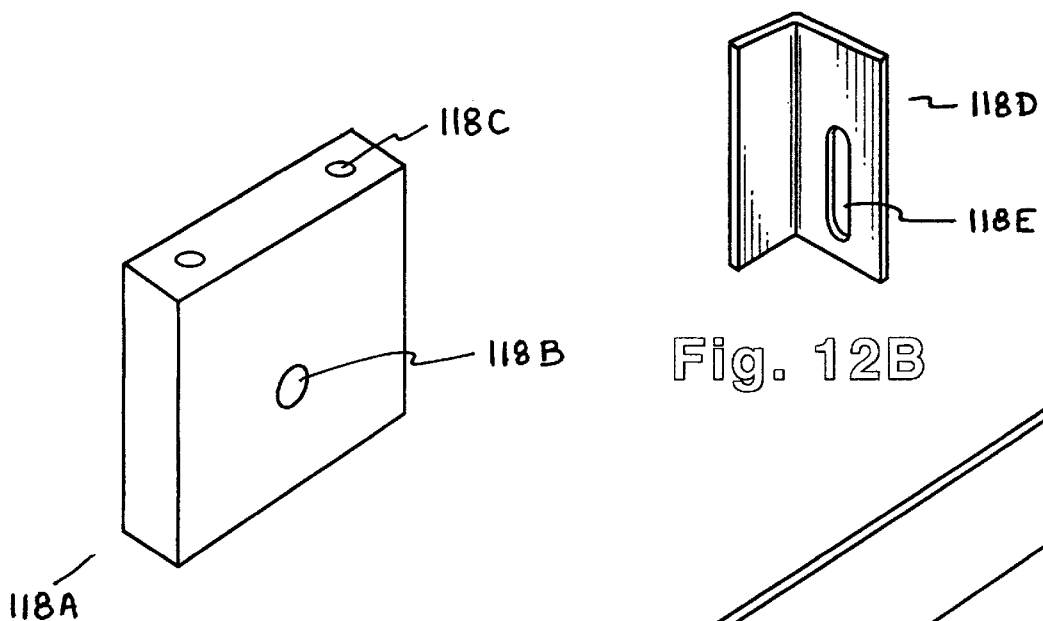
Fig. 12A
Fig. 12B
Fig. 12C

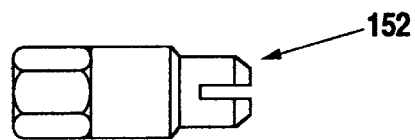
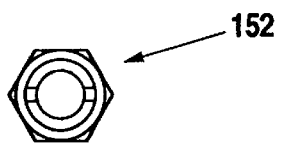
Fig. 15A  Fig. 15B
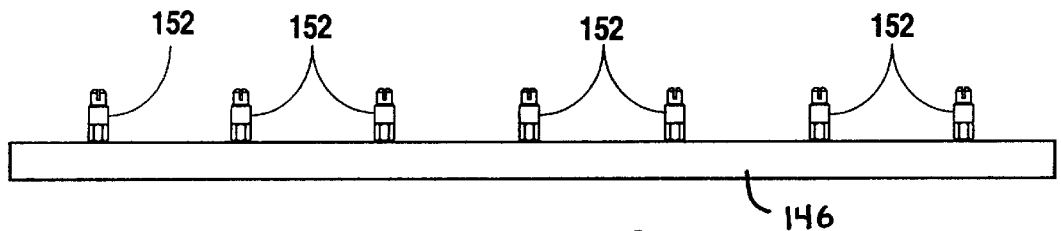
Fig. 15C
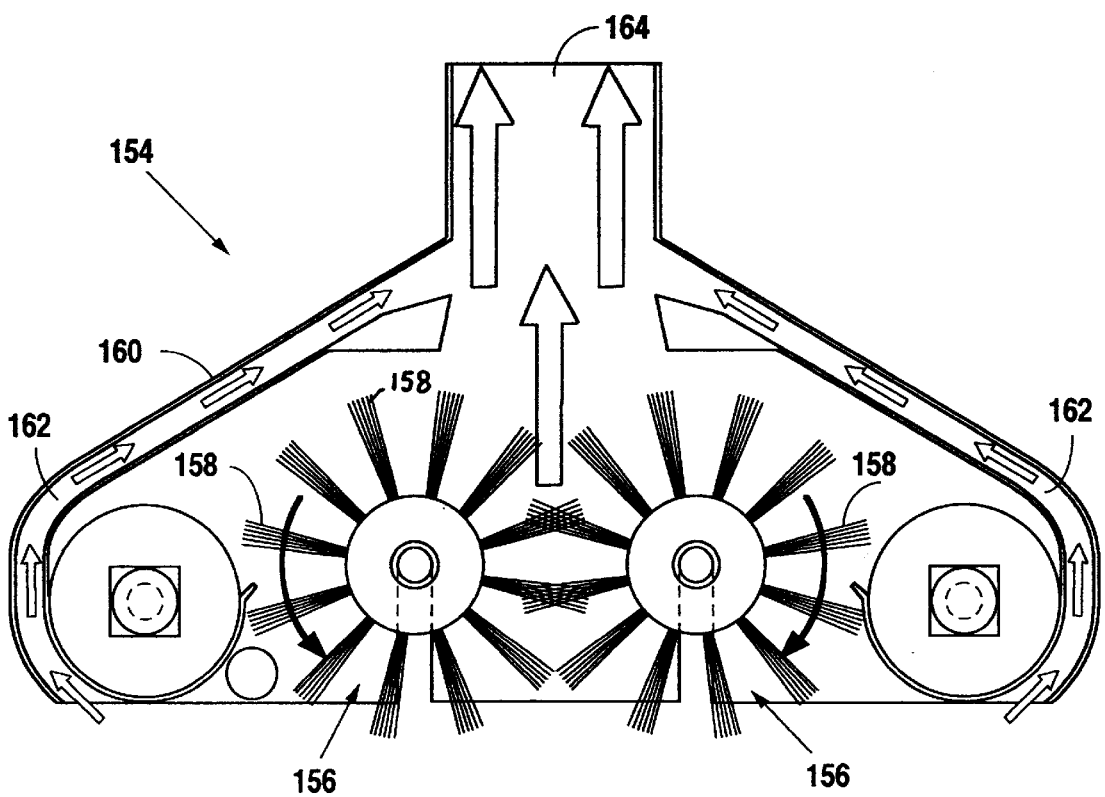
Fig. 16

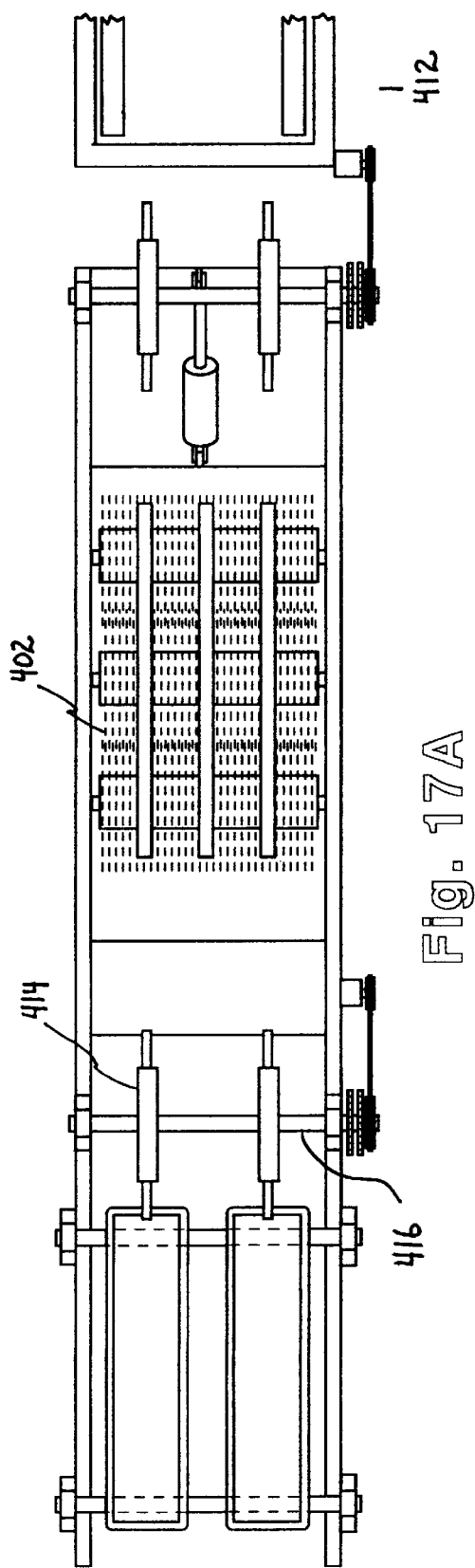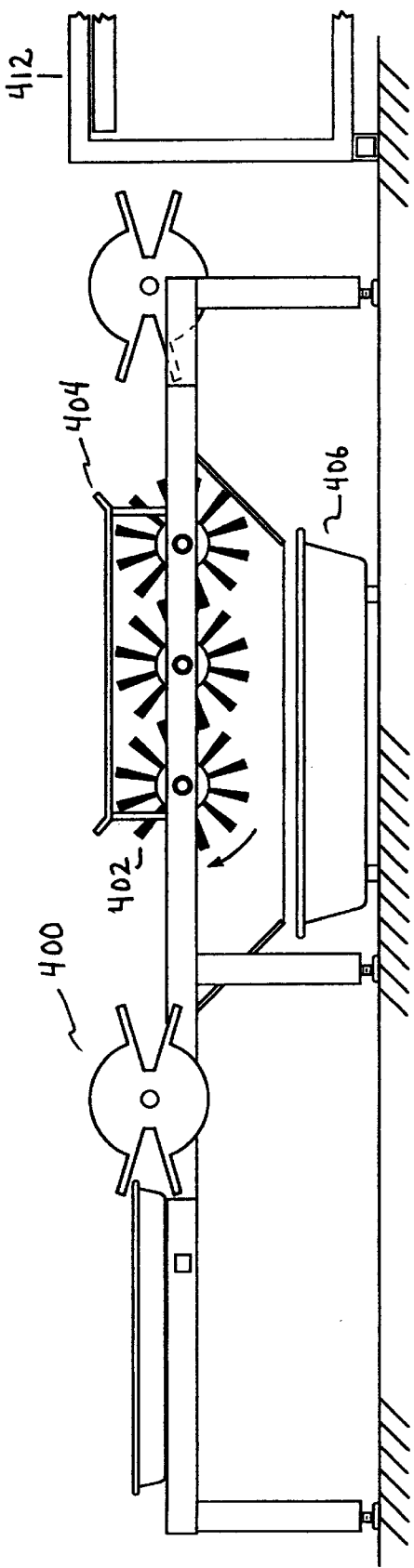

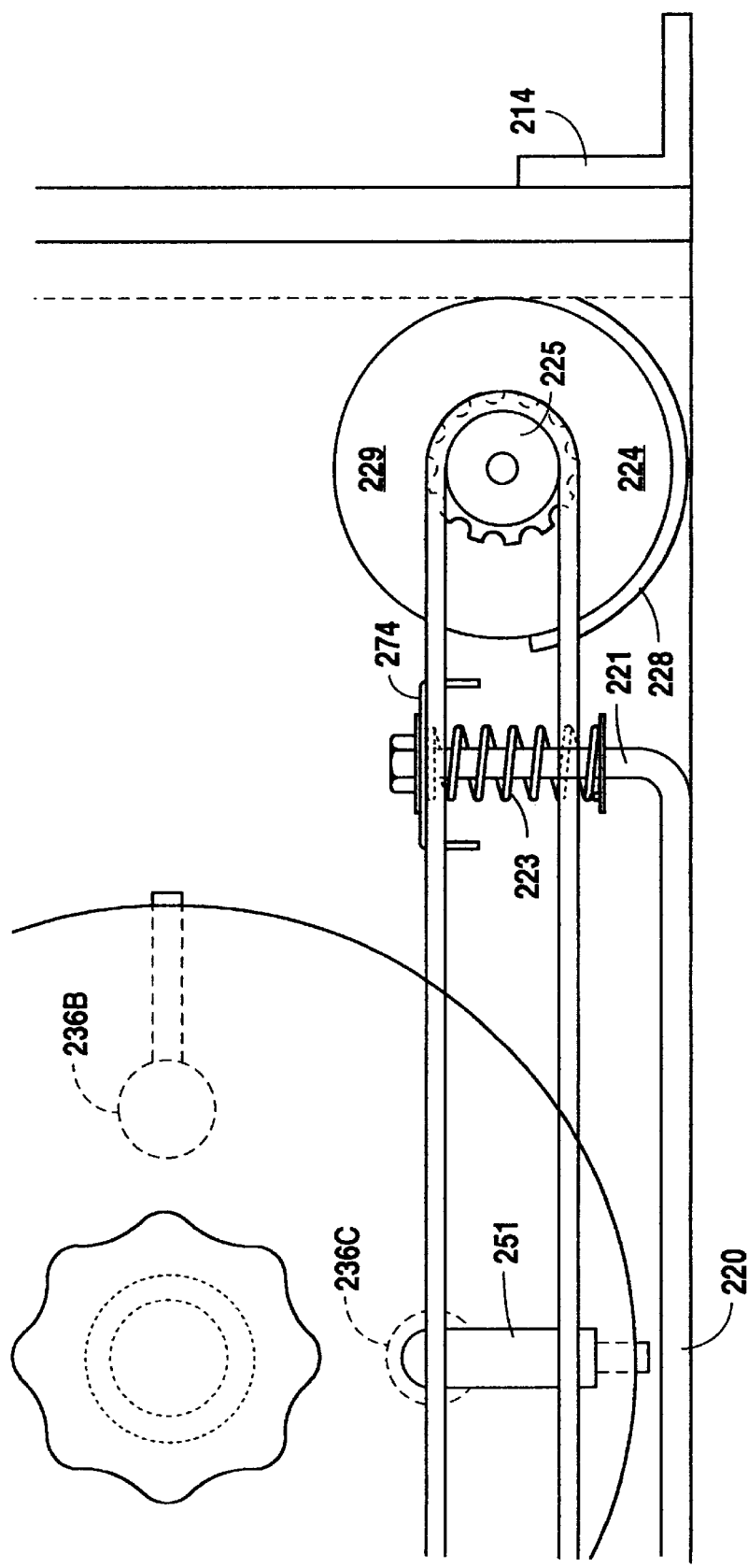

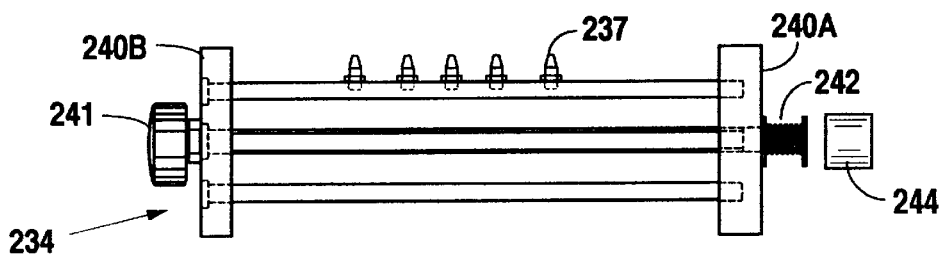
Fig. 22A
Fig. 22B
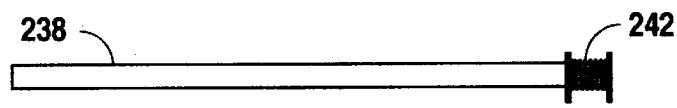
Fig. 22C
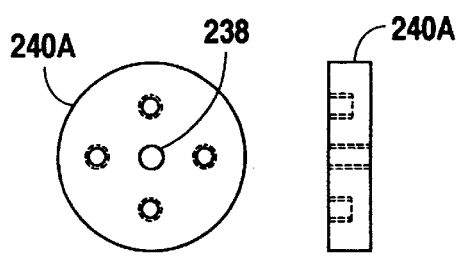
Fig. 22D
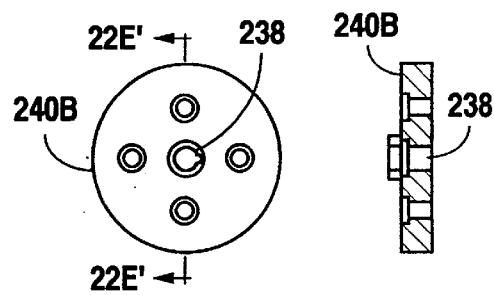
Fig. 22E
Fig. 22F
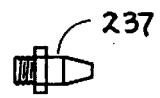
Fig. 22G
Fig. 22H
Fig. 22I

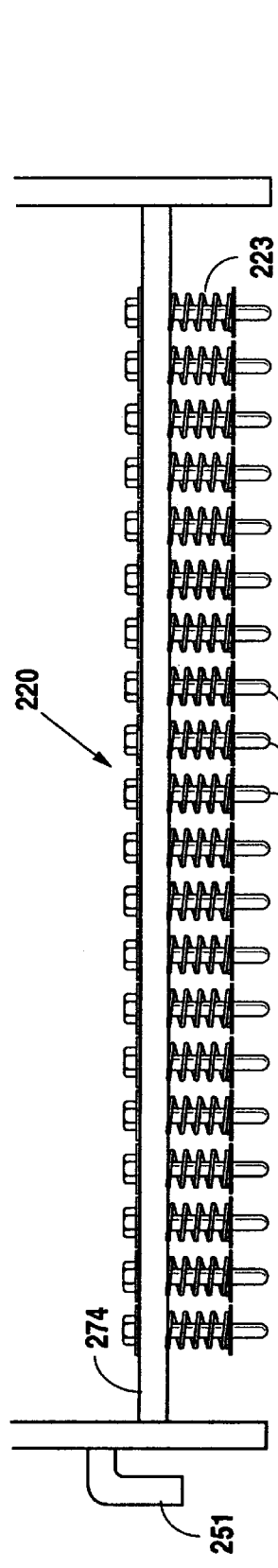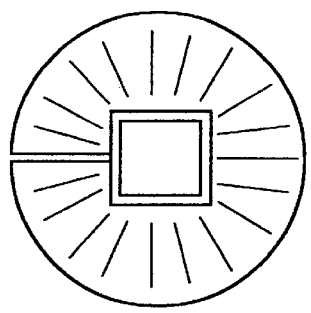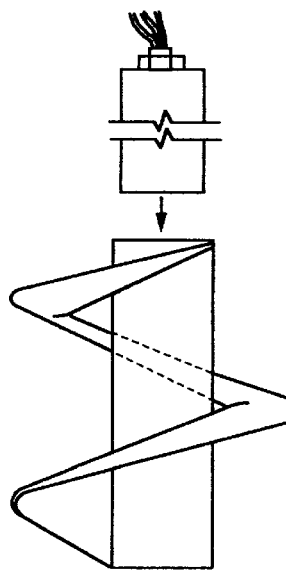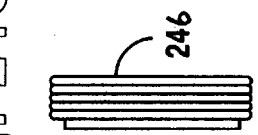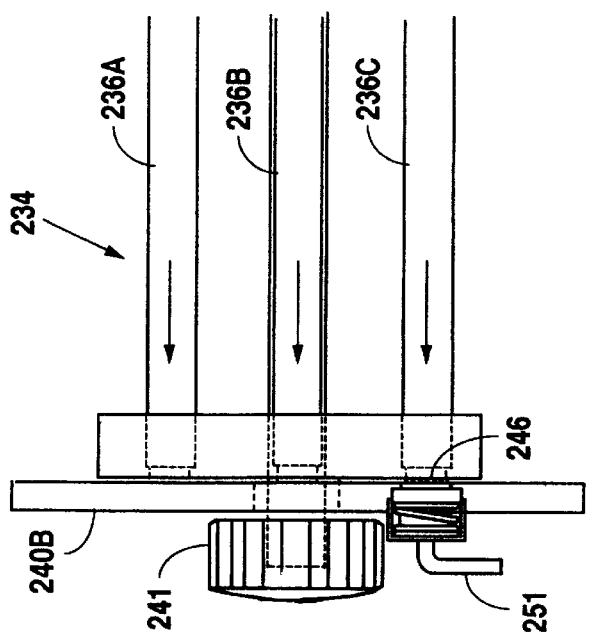
Fig. 25A
Fig. 25B
Fig. 24A
Fig. 24C
Fig. 24D
Fig. 24B ns to catch

BAKED GOOD PAN CLEANER

FIELD OF THE INVENTION

This application claims priority to co-pending U.S. Provisional Patent Application Serial No. 60/098,879 filed Sep. 2, 1998.

The present invention relates to a baked goods pan cleaner; more specifically, a pan cleaner for baking surfaces, the pan cleaner comprised of a pair of counter-rotating brushes for scrubbing the bottom of a baking pan and further includes at least one air jet for directing compressed air onto the surface of the pans and one or more augers to catch airborne seeds and other debris.

SUMMARY

The present invention provides a number of devices relating to bun pan cleaning. First, a bun pan cleaner utilizes rotary brushes in conjunction with augers and air jets to assist in cleaning a pan that has been utilized to cook bake goods. A second device provides for cleaning pans using rotary brushes onto which bakery pans are inverted. Still a third mechanism provides for seed collection such as where there is loose sesame seeds or the like on the buns in the pans.

The present invention is used in conjunction with conveyor belts known in the trade. The devices are intended to decrease the manual labor required for bun pan cleaning and to provide for a simpler and more effective means for bun pan cleaning and for deseeding than has heretofore been known in the trade.

A first embodiment of the invention provides for bun pan cleanup; removing flour, seeds and debris from the baking surface of the pan. The bun pan is carried by a conveyor belt into engagement with the bun pan cleaner. The bun pan cleaner includes at least one motor driven brush for contacting the surface of the pan. It also includes a hood with a vacuum means mounted above the hood for removal of debris dislodged by action of the brushes against the pan surface. An auger is also provided for collecting and removing at least some of the debris that's not taken up through the hood of the bun pan cleaner.

A second embodiment includes a conveyor mounted seed collector and baked goods depanner. The depanner includes a frame and in cooperation with the frame there is provided a means to direct compressed air onto the pan surface. The means to direct compressed air includes a rotatable auger on which number of manifolds are attached. Each of the manifolds has a multiplicity of air jets attached to them. The conveyor mounted seed collector also includes means, such as a grid, to hold down the baked goods while the jets of air directed thereonto (so baked goods are not blown out of the pan).

Yet another embodiment of the present invention includes a multiplicity of rotating brushes and means to flip a right side up conveyor borne pan upside down onto the rotating brushes, where the brushes will contact the baking surface to clean it. Also included is means to flip the pans back right side up onto a pan stacker.

BRIEF DESCRIPTION OF THE DRAWINGS

FIG. 11 is a side view of Applicant's bun pan cleaner including two brushes and a auger.

FIGS. 12A through 12C illustrate perspective views of parts of Applicant's motor mount plate.

FIGS. 15A through 15C illustrate various elevational views of the air nozzles and air tube of Applicant's present invention.

FIG. 16 illustrates an embodiment of Applicant's present invention in side view showing a pair of counter rotating brushes with bar type bristles.

FIGS. 17A, 17B, and 18 illustrate elevational views of Applicant's bun pan flipper for use with Applicant's present invention.

FIG. 21 illustrates a cut away view of a portion of Applicant's seed collector including the grid screen mechanism and auger trough.

FIGS. 22A through 22G illustrate details of the rotary air jet collector components of Applicant's seed collector.

FIGS. 24A through 24D illustrate additional views of the rotary air jets of Applicant's seed collector.

FIG. 25 illustrates an alternate preferred embodiment of Applicant's auger with an electric motor and the center section thereof.

DETAILED DESCRIPTION OF THE PREFERRED EMBODIMENTS

Pans in which baked goods, such as buns or bread, are cooked require cleaning before reuse. Applicant provides an effective device for cleaning conventional conveyor-fed baking pans, wherein the device utilizes a pair of counter-rotating brushes in cooperation with air jets to dislodge refuse material from the pan surface while one or more augers and a vacuum system remove refuse particles from beneath the hood of the bun pan cleaner.

Figure 1:
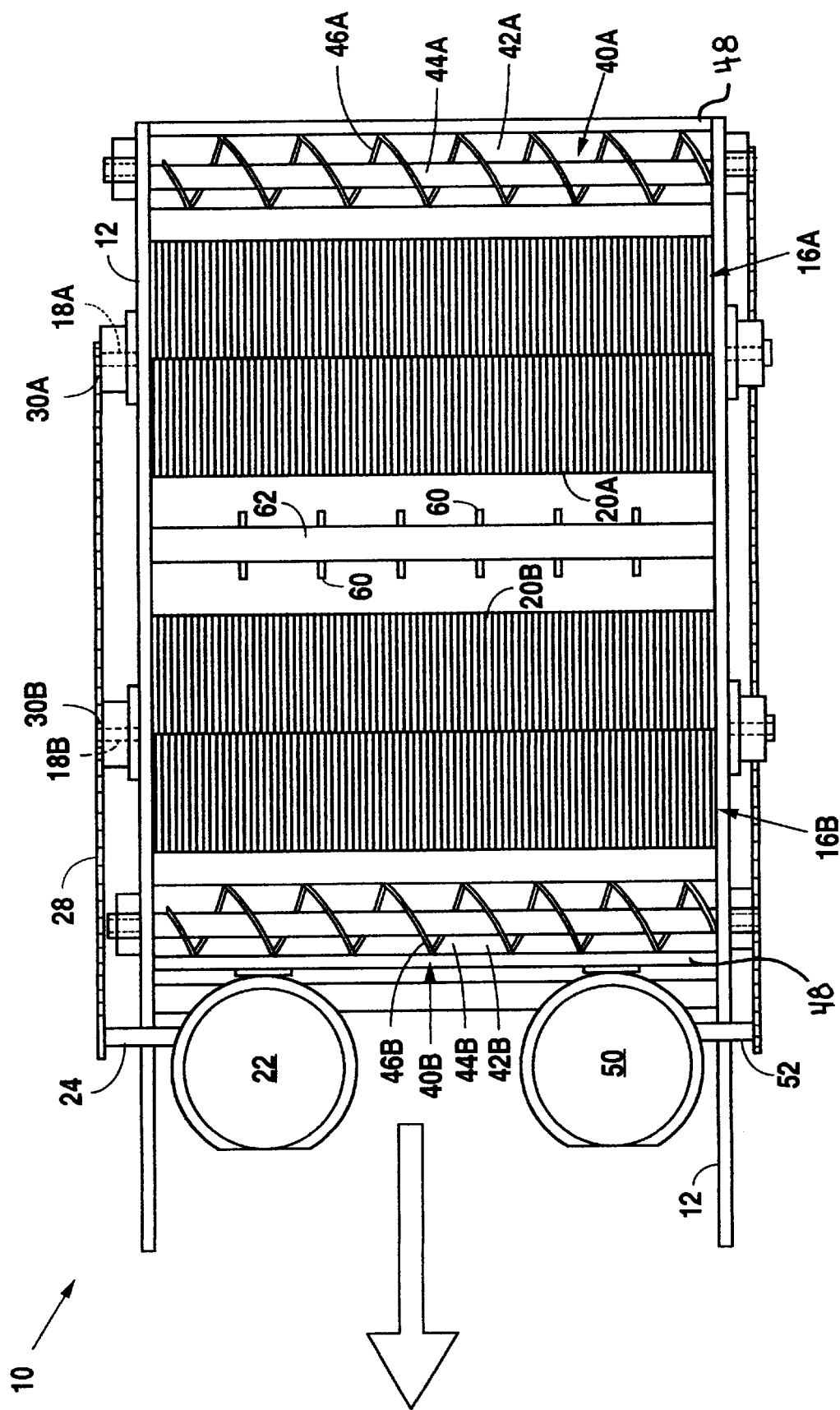
FIG. 1 is the top view of Applicant's bun pan cleaner.
Figure 2:
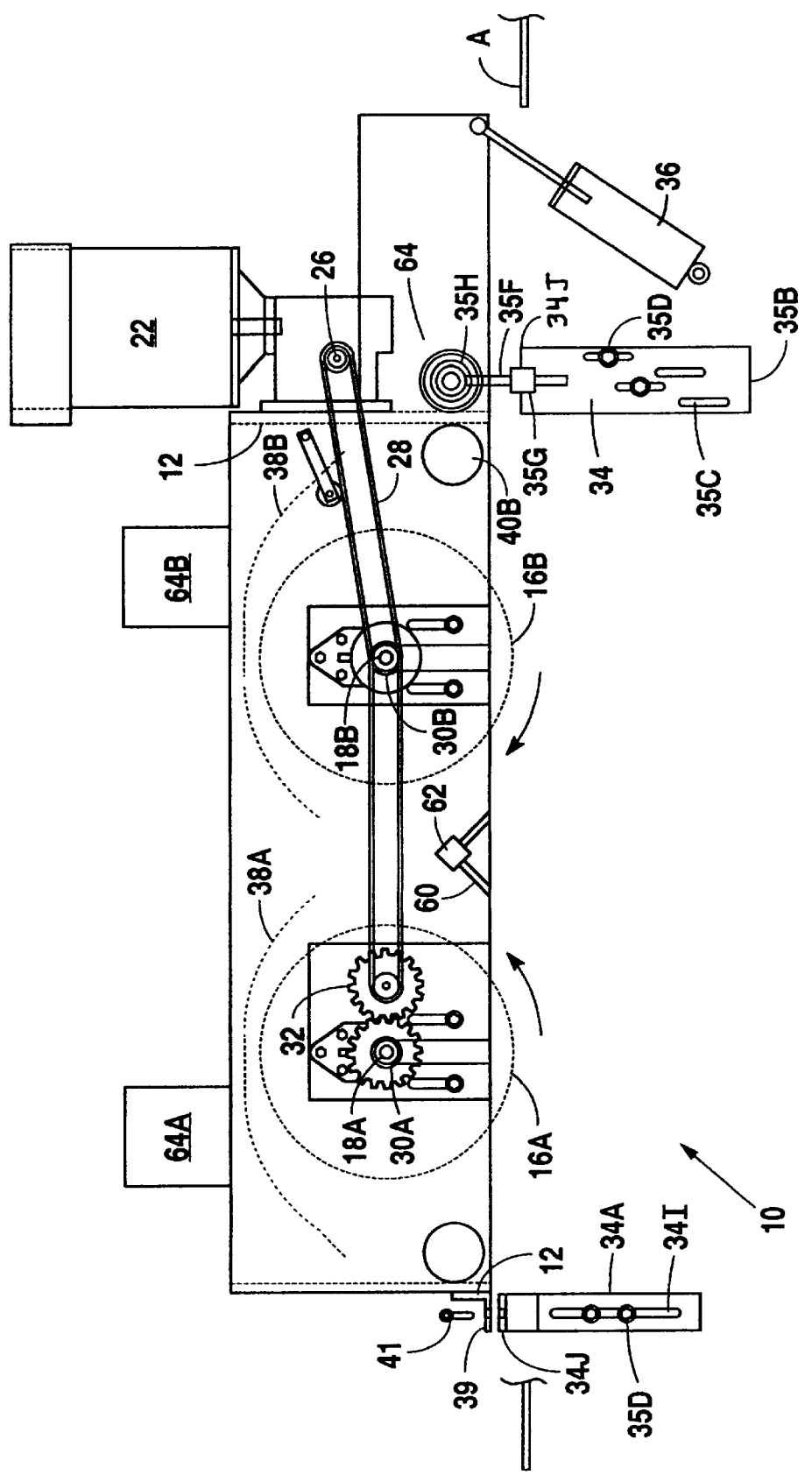
FIG. 2 is the side view of Applicant's bun pan cleaner.
Figure 3:
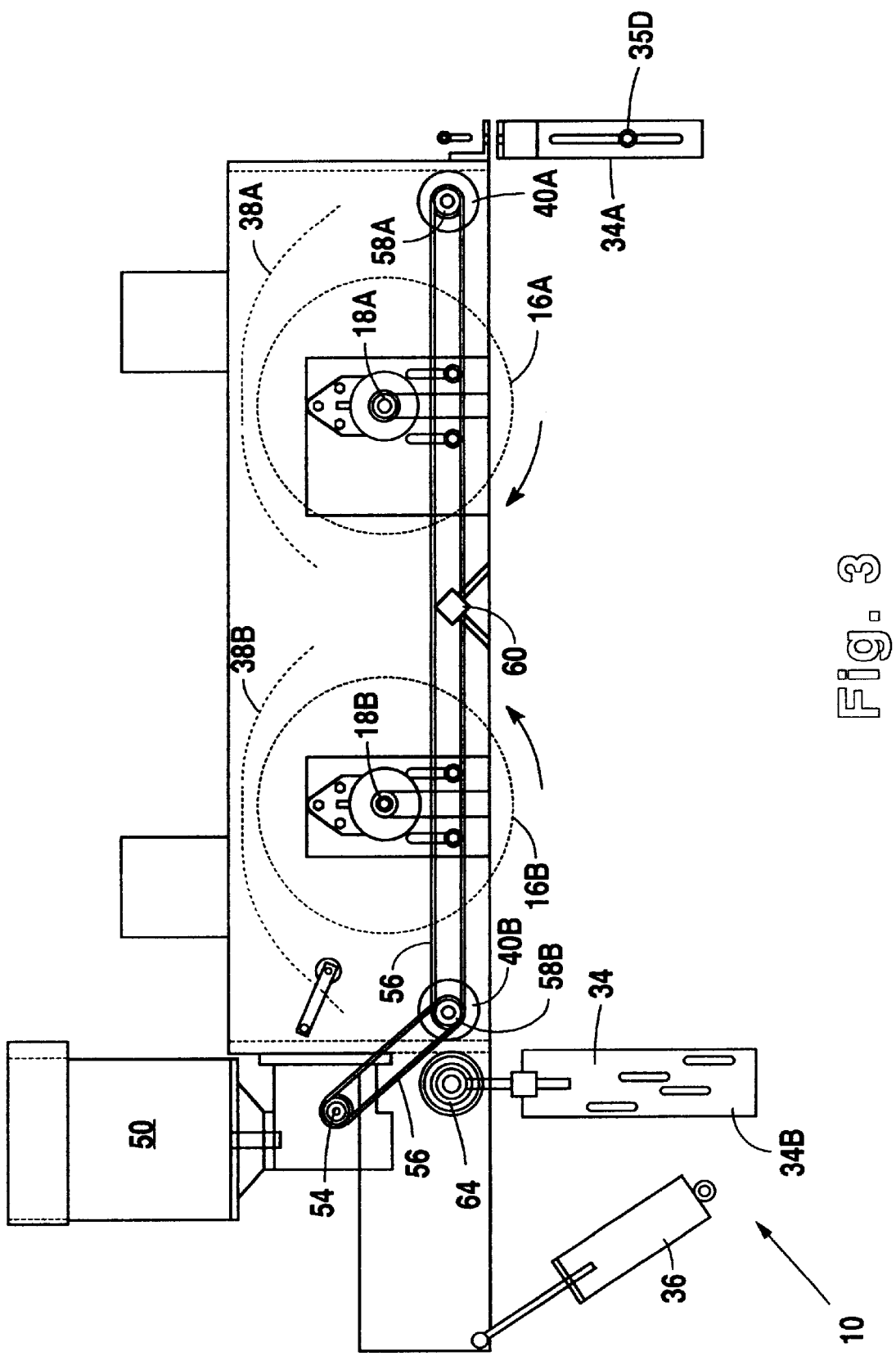
FIG. 3 is a side view of the other side of Applicant's bun pan cleaner.

As can be seen with reference to FIG. 1 (a top elevational view) and FIGS. 2 and 3 (left-and right-side views), Applicant's bun pan cleaner (10) has a frame (12) onto which is mounted a hood (14) for enclosing (except the underside into which the conveyor borne pan enters) the brushes (16A and 16B), augers (40A and 40B), and air jets (62). Mounted to the frame and/or hood are a pair of counter-rotating brushes (16A and 16B) which are located on brush drive shafts (18A and 18B), the drive shafts (18A, 18B) and brushes (16A, 16B) positioned transverse to the direction of pan travel (FIG. 1). Located on the drive shafts and extending generally perpendicularly therefrom are sets of brush bristles (20A and 20B) similar to those found on drive-through car washes. Drive shafts (18A and 18B) may be mounted to either the frame (12) or the hood (14) and are belt or chain-driven by an electrically powered brush drive motor (22) which acts through a motor drive shaft (24) to energize motor drive shaft sprocket (26) which, in turn, engages, through chain or belt (28) brush drive shaft sprockets (30A) and (30B), with one of the brush drive shaft sprockets typically being operated through a counter-rotating gear (32) (see FIG. 2).

Figure 4:
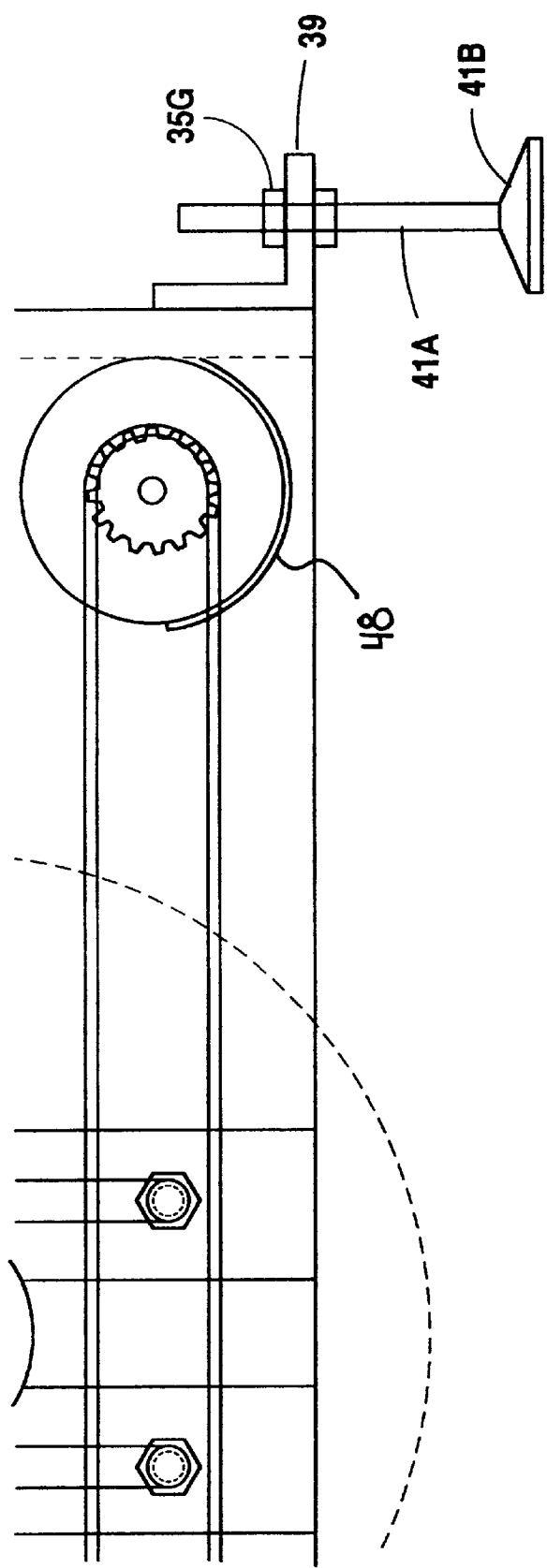
FIG. 4 is a partial cut away view of Applicant's bun cleaner.

As seen with reference to FIGS. 2 and 3, the bristles of the brushes extend below the frame/hood of the cleaner (10) to make contact with the conveyor belt-borne pans. Further, it is seen that the unit may be moved up or down mechanically, pneumatically, or hydraulically on height adjustment legs (34) (two per side) which are pivotable from one end, allowing pneumatic lift cylinder (36) to raise and lower the unit for servicing and maintenance. Properly adjusting the height of the unit will allow the counter-rotating bristles of the counter-rotating brushes to contact the surface of the pan and sweep up debris from the surface of the pan in the direction of the arrows indicated in FIGS. 2 and 3. Moreover, as seen with reference to FIGS. 2 and 3, a pair of baffles (38A and 38B) are positioned above the brushes to direct the brushed debris to a pair of augers (40A and 40B) positioned at opposite ends of the frame. Augers (40A and 40B) are seen to be comprised of screws (42A and 42B), the screws rotating on shafts (44A and 44B), the shafts extending transversely across the frame, and the shafts carrying helical blades (46A and 46B). With further reference to FIG. 4, it is seen that screws (42A and 42B) each rotate within their own auger channel (48). The auger channel is a generally concave trough whose radius of curvature is about the same as that of the blades. It can be seen that the blades are pitched such that rotation of the screw in the auger channels allows any debris falling into the auger channel to be swept to one end of the trough, where it can be collected or swept out of a port (not shown) for collection in a disposable bag.

Auger shafts (44A and 44B) are driven by auger drive motor (50) which rotates auger motor drive shaft (52) when the auger motor, typically electric, is energized. The auger motor drive shaft has located on an outboard end thereof, typically by key or otherwise, an auger motor drive sprocket (54) (see FIG. 3). The drive sprocket drives, through a chain or belt (56), auger shaft drive sprockets (58A and 58B) which are located on an end of shafts (44A) and (44B).

In addition to rotating brushes which help sweep debris into augers, which then tend to move the debris to one end of the unit for removal therefrom the present invention includes a multiplicity of air jets (60) fixed to an air jet manifold (62) extending generally transverse to the direction of travel of the pans and aligned with the shafts of the augers and rotating brushes. The air jet manifold (62) distributes compressed air forced through air jets (60). The air jets are directed downward down onto the pan (see FIG. 3) to help loosen or remove debris from the surface of the pan being cleaned.

Figure 5:
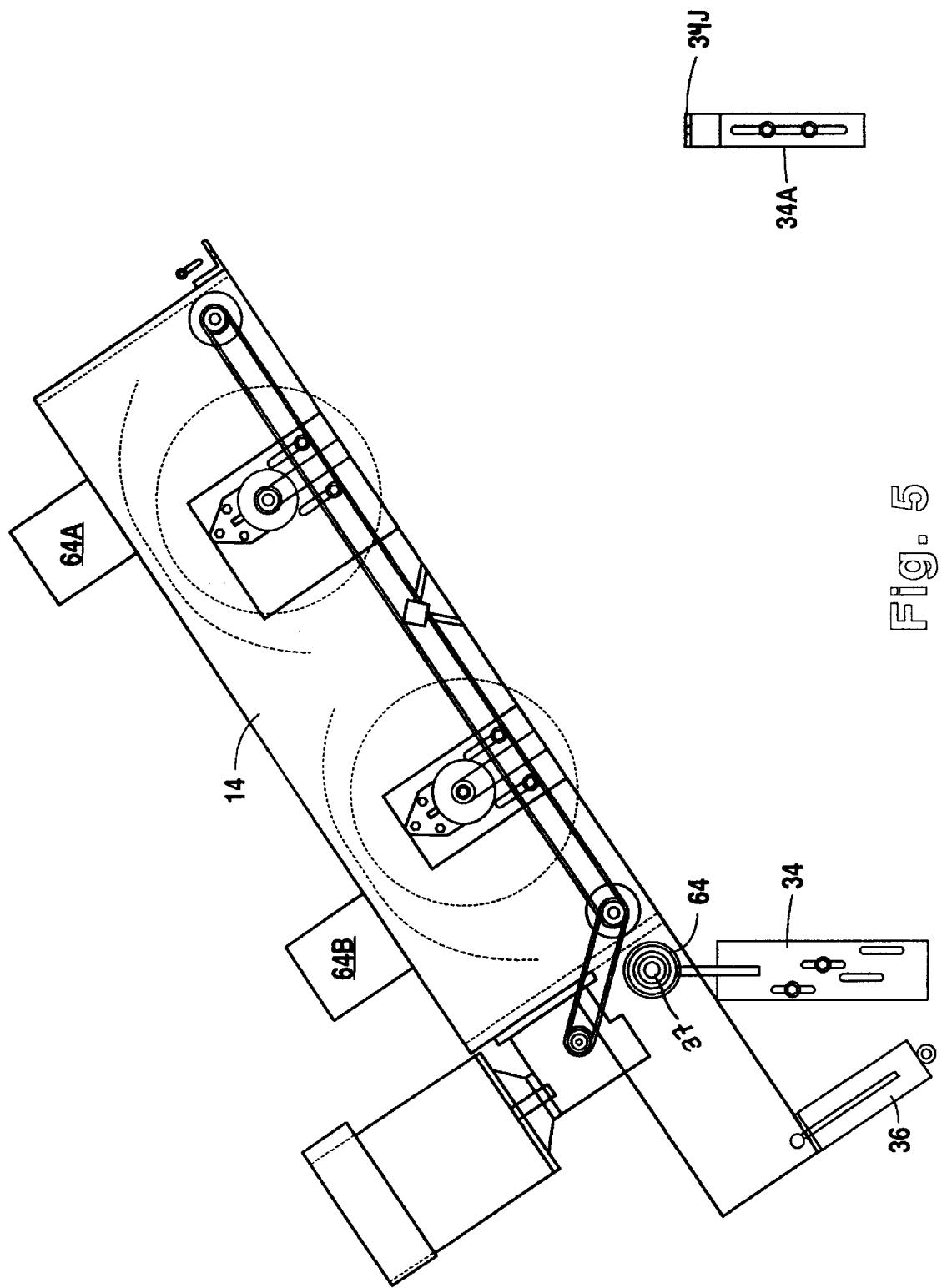
FIG. 5 is a side elevational view of Applicant's bun pan cleaner showing it in a rotated to a nonuse position.

FIGS. 2, 3 and 5, when viewed in conjunction with the preceding discussion, specifically illustrate how legs (34) closest to pneumatic lift cylinder (36) have pivots (64) at a removed end thereof and how other legs 34A simply support the frame without rigid engagement, thus allowing the unit to rise as illustrated in FIG. 5. Thus, the unit is designed to raise to allowing cleaning and service.

FIGS. 2, 3 and 5 show a pair of legs 34 adjacent to pneumatic lift cylinder 36. These legs include a steel mounting plate 35B. Mounting plate (35B) has vertically aligned slots (35C) dimensioned to receive fasteners (35D) which mount the plate to the conveyor belt frame in a manner allowing for vertical, plate height-adjustment and cleaner (10) height-adjustment above the conveyor belt. Fasteners (35G) may be nuts and bolts known in the trade or other suitable means. A portion of mounting plate (35B) includes perpendicularly mounted support arm (35E). Threaded through or otherwise dimensioned to be received through the support arm (35E) is a threaded rod (35F) on which is received a pair of locating nuts (35G), typically one on either side of support arm (35E) to rigidly maintain the rod on the support arm. It is seen that the distal end of the rod includes an eye portion or other articulating means (35H) which can attach to a mounting stud (37) or other articulation point such that the rod and mounting stud combination can vertically maintain the position of the frame and hood above the conveyor belt but also allow the unit to pivot about legs (34) at stud (37). A suitable pneumatic lift cylinder (36) is available from McMaster-Carr Corporation.

Another suitable pivoting means to articulate the frame and hood unit would have an axle running between the two rods (35F) and mounted on bearings to the frame or hood. Any other suitable means that would allow articulation may be used.

Turning now to legs (34A) (one on each side of the unit) it is seen with references to FIGS. 2, 3, 4, 5, and 6, that they too have slots (34I) therein to which fasteners (35D) may be affixed and, the legs are each seen to have a flat portion (34J). Thus, this leg is vertically adjustable also but simply rests against angle brace (39) leg rest, the angle brace being attached to the frame or hood (See FIG. 2). A removable pin fastener, adjustable member or other means (41) is insertable between the two vertically aligned holes—one in angle brace (39) and one in flat portion (34J)—to maintain alignment and contact and to help brace and fasten the unit to the conveyor belt or other support means. Of course, fastener (41) would be removed before lifting the hood for cleaning.

Drive motors are available through sources known in the trade although use of a motor to drive an auger is believed to be novel, as well as the use of the auger itself.

An alternate to the use of fastener or pin (41) is the use of adjustable member (41A) which has a foot (41B) thereon, the adjustable member being engaged through a hole in angle brace (39) (see FIG. 4). Nuts (35G) on either side of angle brace (39) provide another means to adjust the height of the unit over the conveyor belt.

The brushes may be changed out, and are designed to engage, without damaging, a bun pan's glazed surface. The motors are energized by a conveyor mounted proximity switch; which means, if there is no pan beneath it, there is no energizing the brushes and augers.

A conveyor A feeds the cleaning unit (10) unclean pans from a table-top chain and a conveyor belt. The belt under the unit (10) may be tracked using a V-section belt guide. A magnet is located under the belt to hold the pan in position while in contact with the brushes. The table-top chain conveyor can be made in the length necessary to accommodate any pan system.

It maybe seen that the present invention also includes the use of a vacuum motor and duct unit to withdraw airborne dust and debris into a cyclone with air relief bags to keep the interior portion of the unit (within the hood) in negative air pressure. More specifically, with reference to FIG. 2, it is seen that Applicant's unit contains, mounted on the hood, vacuum discharge units (64A and 64B). With respect to the air jets, they are used to "flutter" food off the pan and blow loose seed around, some of which will be collected by the auger. The hood and vacuum control help get rid of dust and other lose debris. Manual switches may operate the brushes and augers; the proximity switch will typically operate the compressor and air jets.

Turning now to FIGS. 6 through 9 an additional embodiment of present invention is described, which may typically be used to clean bun pans rather than to cleaning bread pans. This embodiment has a single center mounted auger driven by a motor and a pair of side mounted counter-rotating brushes along with one or two of sets of air jets (60A and 60B) mounted outboard the brushes and directed obliquely with respect to the conveyor belt and pan.

This embodiment includes a unique brush mounting system (100) which allows the brushes (102A and 102B) to be dropped lower in the frame (104) of the unit as the tips of the brushes get worn away. The tips of the brushes tend to get worn away as they beat against the pans and applicants invention provides for quick, easy, vertical adjustments of the brushes with respect to the frame so they can drop down. This can be done without any cumbersome adjustment of the linkages, belts or chains between the motors that drive the brushes and the brushes themselves.

Figure 10:
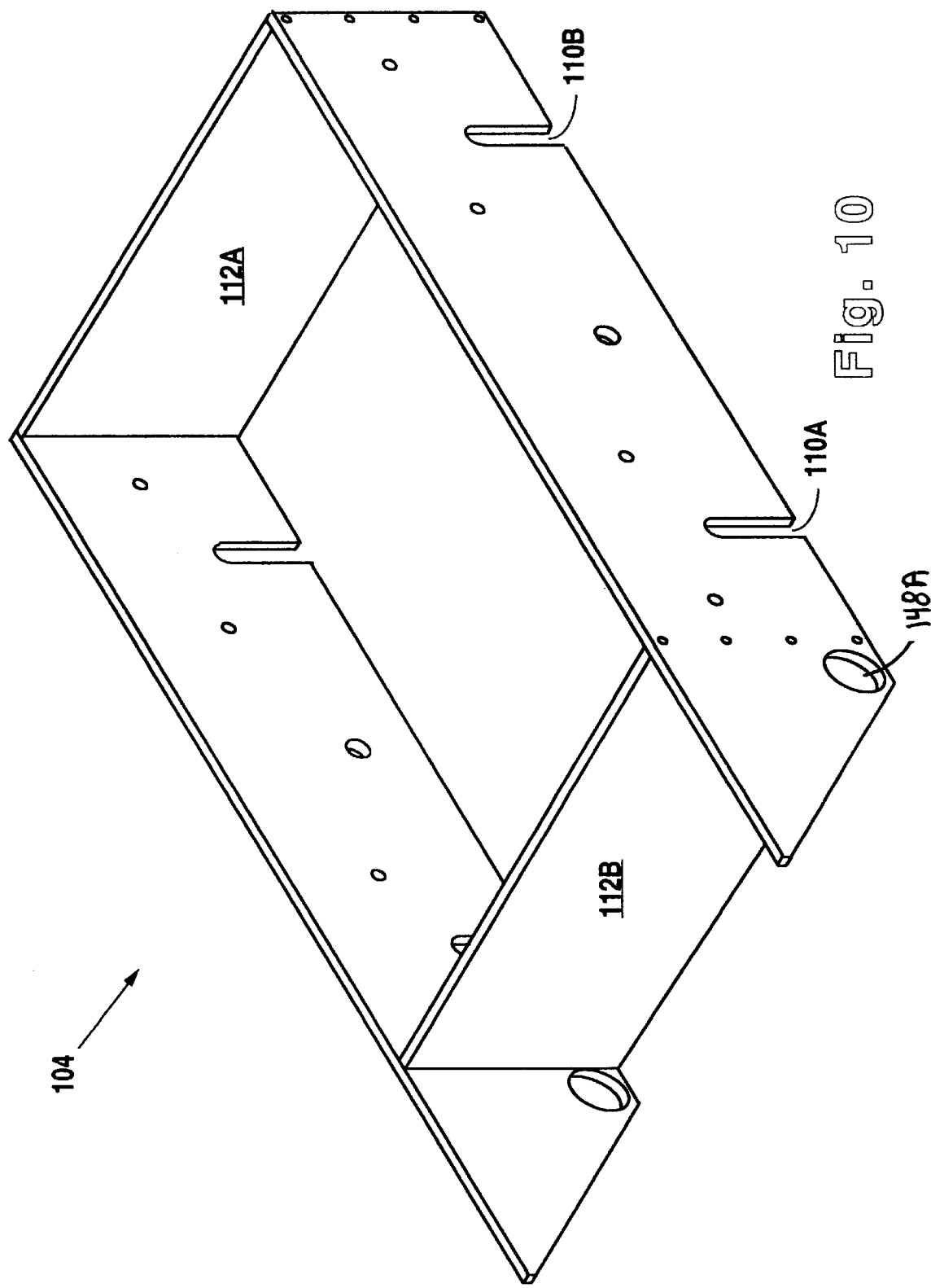
FIG. 10 is an illustration of a frame for use with Applicant's bun pan cleaner.

The brushes are mounted on drive shafts (106A and 106B). The brush drive shafts have on one of the outboard ends drive shaft spur gears (108). The brush drive shaft is mounted in a pair of vertically oriented side slots (110A and 110B) in each of the two one-half inch aluminum side walls that make up part of the frame (see FIG. 10). The slots open to the bottom of the frame. With reference to FIG. 10, it is seen that the frame is made up of typically half-inch aluminum end walls (112A and 112B) with the two half-inch aluminum sidewalls the four walls attached form a rigid rectangular structure which has, as a roof, a sheet-metal member (114), typically 12 to 14 guage sheet material.

In any case, the brush drive shafts are mounted through the side slots with the drive shaft spur gear on one end thereof, both ends of the drive shaft being mounted on a pillow block bearing (116A and 116B) which is bolted vertically into a motor mount plate (118), which motor mount plate bridges across from one sidewall to the other and to which the two brush drive motors (120A and 120B; 120B being a combined auger and brush drive motor) are mounted. These two motor mount plates (118) (one for each motor) have a pair of vertical slots (122) therein in which several plate lock fasteners 124 are located. The motor mount plates have a horizontal portion and a vertical portion. The plate lock fasteners (124) go through a hole in the frame sidewall (see FIG. 10) and, utilizing a nut and bolt may, when tightened down hold the vertical portion of the motor mount plate tight against the aluminum sidewall (see FIGS. 12A–C).

Figure 6:
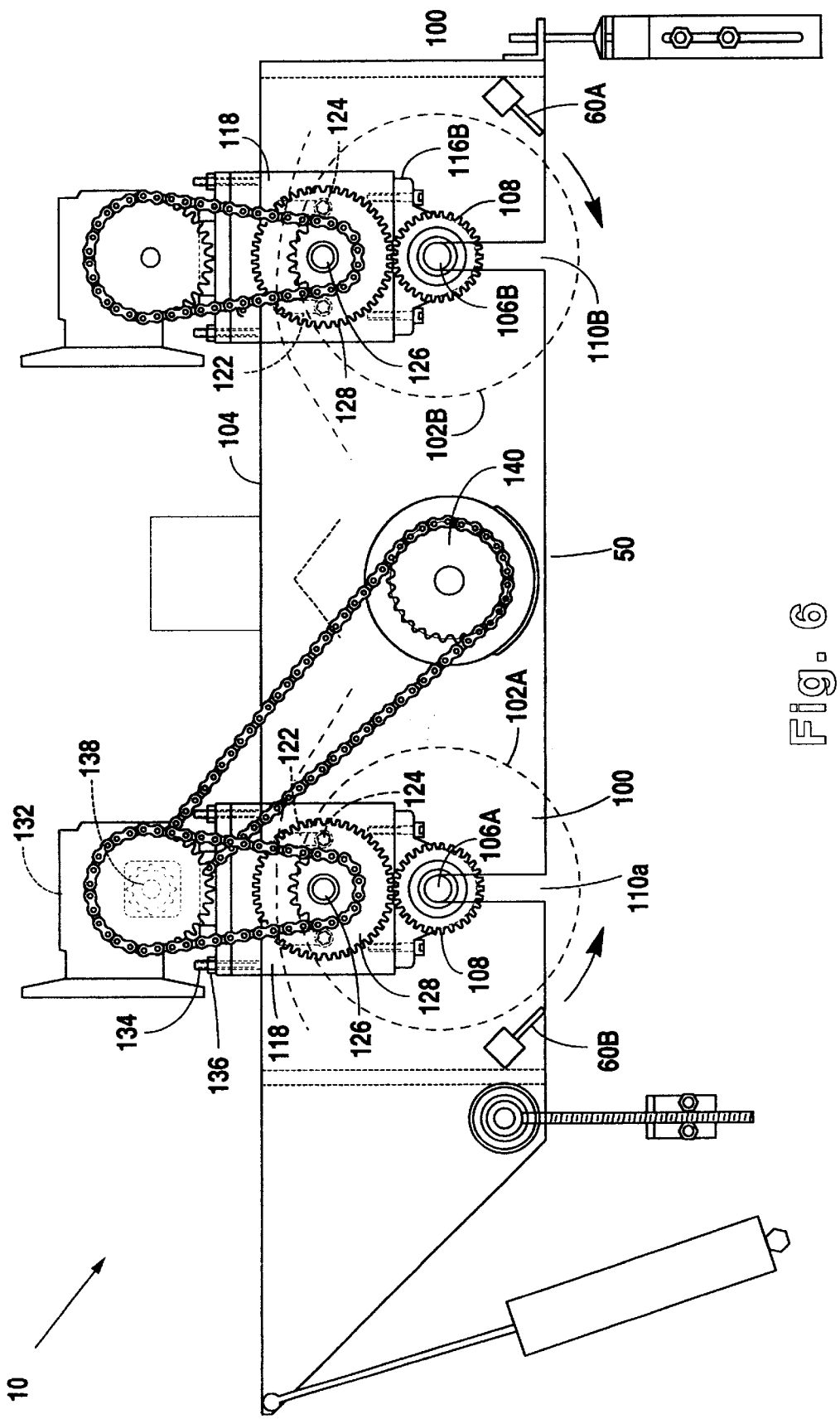
FIG. 6 is a side view of an alternated embodiment of Applicant's bun pan cleaner.
Figure 8:
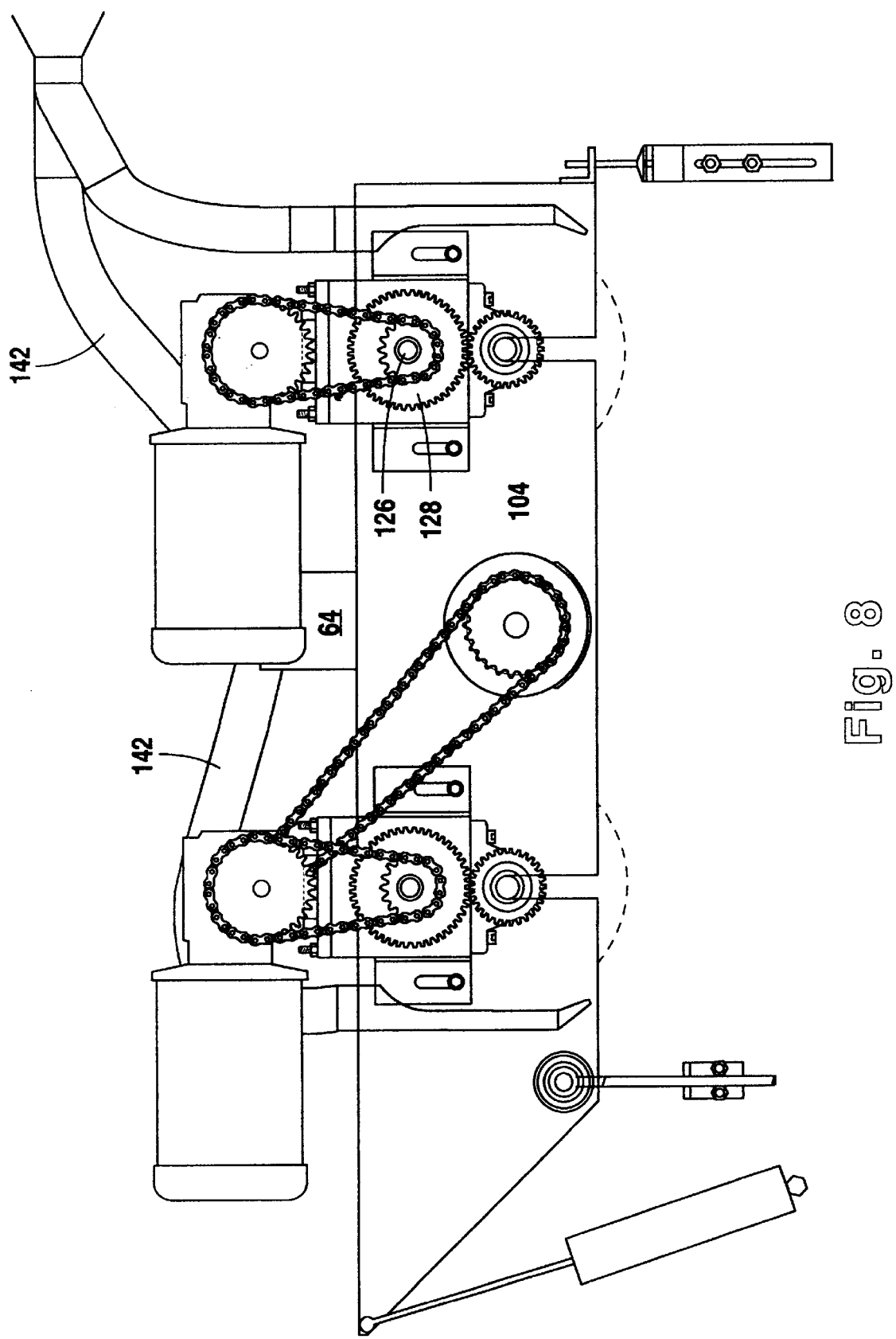
FIG. 8 is a side view of an alternate embodiment of Applicant's bun pan cleaner.

There is, mounted to the vertical portion of the motor mount plate as seen in. FIG. 6 a short stub axle (126). On that stub axle is mounted, on ball bearings or other bearing surfaces, a sprocket/spur gear unit (128). The spur gear portion of the sprocket/spur gear unit is designed to mesh with the spur gear on the brush drive shaft. The sprocket portion of the sprocket/spur gear is chain or belt driven from the drive sprocket that comes off a ("c-face") reduction gear box (132), such as the reduction gear box available from Tigar Manufacturing. The c-face reduction gear box is mounted to the brush and auger motor (120B) and the second brush drive motor (120A) as seen in FIG. 8. Motors may be one-half horse power, and are available from Leeson Manufacturing.

The reduction gear box and the motors are mounted to the horizontal portion of the motor mount plate (see FIG. 12C) which is integral with the vertical portion of the motor mount plates into which the vertical adjustment slots are located. There a pair of vertical positioning headless hex bolts (134) threaded though the horizontal portions of the motor mount plates on either end thereof which vertically position the motor mount plate with respect to the sidewalls by inserting an allen key into the hex portion on the removed end of the headless hex bolts and rotating them. When doing so, the far end of the headless hex bolts will engage the top of the aluminum sidewalls so as to raise (or lower) the entire motor mount plate with respect to the sidewalls. In other words, by using an allen key and adjusting the four headless hex bolts on each of the two motor mount plates, they may be raised or lowered, with respect to the sidewalls, so long as the plate lock fasteners are loose. When the desired vertical position of the brush drive shaft is reached, then the plate lock fasteners can be tightened so as to urge the motor mount plate up against the sidewalls on either end and to rigidly hold the drive shaft brush tightly in place.

As the brushes wear away, the plate lock fasteners on either side can be loosened and the vertical position adjusted; the headless hex bolts are backed out to lower the whole unit without having to adjust the chain between the drive sprocket or any of the other drive elements of the brush drive shaft.

Note the lock nuts (136) on the headless hex bolts, which can be tightened against the horizontal portion of the mounting plate when the desired vertical position of the brushes is reached. Note with respect to FIG. 6 that the drive sprocket also has an auger drive sprocket 138 incorporated therewith to drive the auger drive shaft sprocket 140 though the use of a chain off the reduction gear box.

FIG. 8 also shows the use of vacuum discharge (64) along with vacuum ducts (142) to draw out debris and other air borne particles generated by the action of the brushes and/or the air blast.

Figure 7:
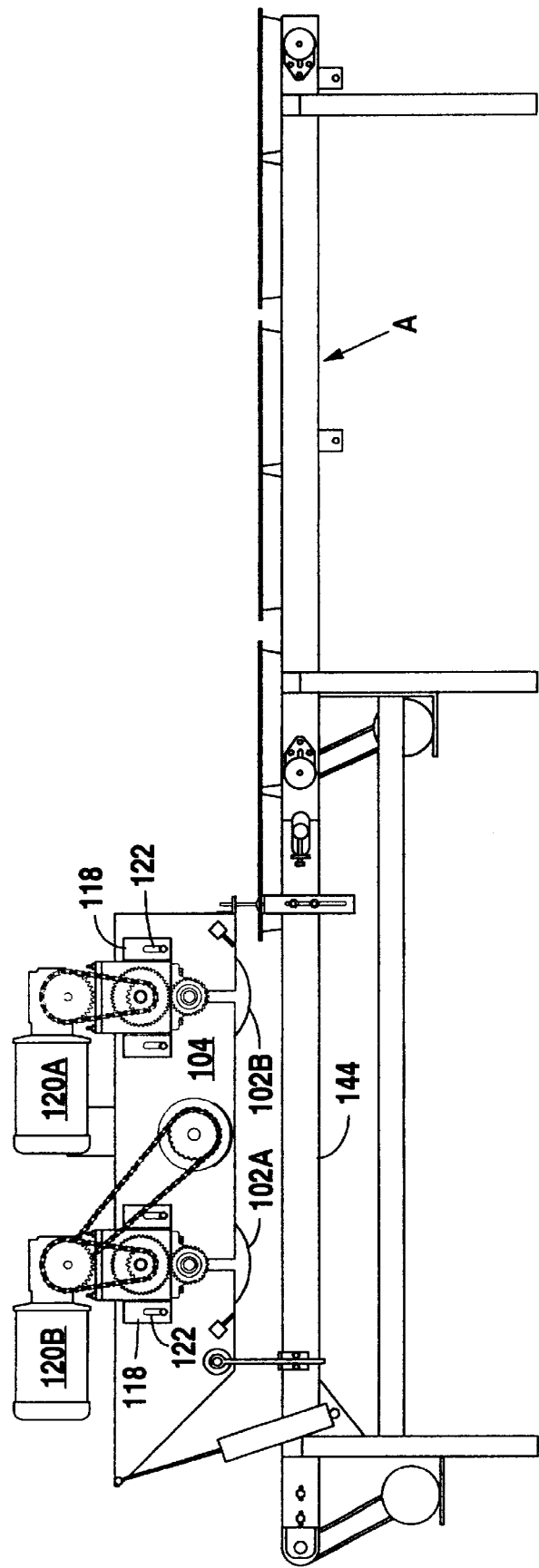
FIG. 7 is a side view of an alternate embodiment of Applicant's bun pan cleaner.

FIGS. 7 and 8 provide additional details of Applicant's pan cleaner. As can be seen in FIG. 7, a table-top chain conveyor (A) having pans on the surface thereof, which typically have just had the buns removed therefrom, is fed beneath Applicant's conveyor mounted pan cleaner on a belt driven by a conveyor motor. A permanent magnet (144) beneath the top section of the endless conveyor belt will hold the pan snug up against the conveyor so that the action of the brushes and/or the air does not jostle the pan out from underneath the conveyor. The brush tips should obviously extend far enough down below the frame so that they contact the pan surface to be cleaned.

Figure 9:
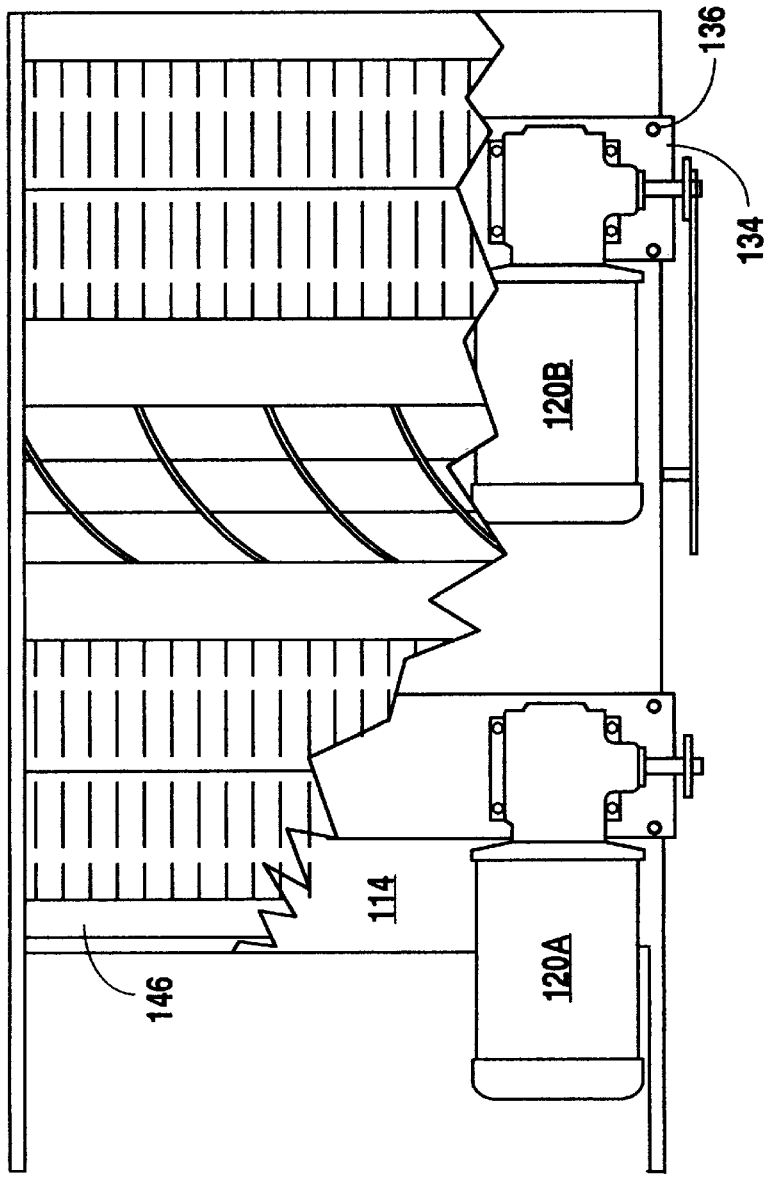
FIG. 9 is a top view partially cut away of an alternate embodiment of bun pan cleaner.

FIG. 9 shows a top view cutaway illustrating a sheet metal roof (114) (typically 10 to 12 gauge) and also illustrating the position of the headless hex bolts (134) on the horizontal portion of the motor mount plate. However, in FIG. 9 there is illustrated a single air blast tube (146), which is sometimes preferred to the dual air blast tubes 146A and (146B) model illustrated in FIG. 11. It tends to control the scattering of debris better.

FIG. 10 illustrates the bun pan cleaner frame typically comprised of a pair of end walls and a pair of side walls attached to form a rigid, generally rectangular unit. The side walls have an extended portion where the pivot shaft bearing holes (148A) may be mounted for mounting the pivot shaft thereto and where the shaft of the lift cylinder attaches. The pan cleaner frame has holes for plate lock fasteners, a hole on either side wall for mounting the auger drive shaft and vertical slots in both side walls for sliding the brush drive shafts therein.

FIG. 11 illustrates the pan cleaner mounted to a conveyor belt on the adjustable legs and illustrates the use of ball joint ends (rod ends) (148) where the lift cylinder (150) attaches to the conveyor A and also where it attaches to the extended portion of the side walls of the frame of the unit. These ball joint ends are available from motor supply houses and are typically used in the manner of tie-rod ends (or the like) with the ball rotatably mounted into a concave portion of an end member to allow the axle or stud extending through the ball to articulate. It is to be understood that in FIG. 11 the air jets (146A and 146B), while being visible in the side view, are actually mounted on the air blast tube which is inside the frame between the two side walls and typically has a multiplicity of jets mounted thereto.

FIGS. 12A–12C illustrate details of the motor mount plate. In FIG. 12A, the vertical portion of the motor mount plate is illustrated with a stub axle mounting hole and a pair of pillow block bearing mounting holes 118C therein. FIG. 12B illustrates the aluminum angle brace 118D with slots 118E that is welded to the side walls of the vertical portion of the plate and FIG. 12C illustrates the motor mount plate horizontal portion 118F, which is welded to the two end walls of the two vertical portions of the motor mounting plate and to which the brush motors are attached.

Figure 13:
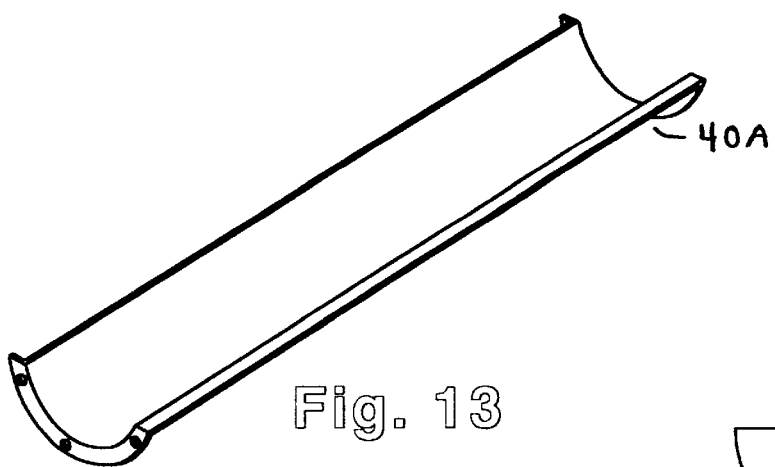
FIG. 13 illustrates an auger trough in perspective view for use it with Applicant's bun pan cleaner.
Figure 14A:
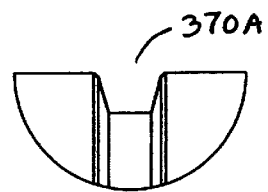
FIGS. 14A through 14D illustrate various views of Applicant's conveyor rollers and conveyor belts for use with Applicant's bun pan cleaner.
Figure 14B:
Figure 14C:
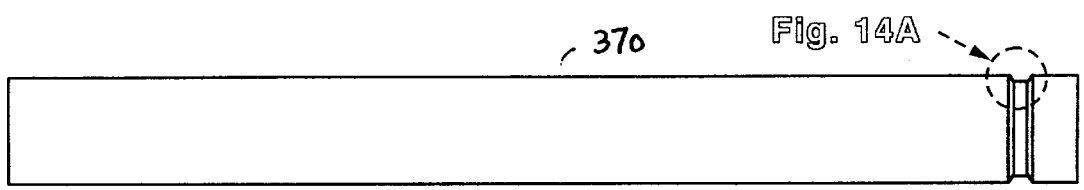
Figure 14D:
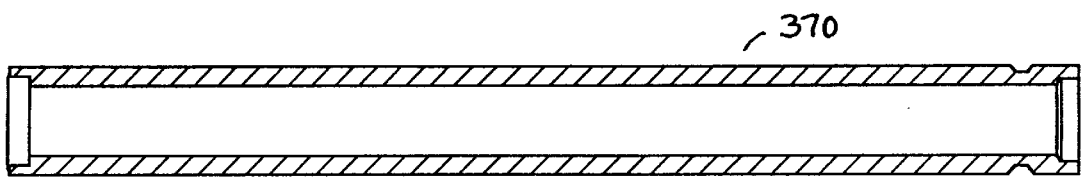

FIG. 13 illustrates an auger trough, typically made of approximately 14 gauge stainless steel, with mounting lips at the end thereof to mount the trough to the inside surface of the side walls of the frame of the unit with fasteners or other means.

FIG. 14 illustrates details of the conveyor rollers 370 and conveyor belt 372 of Applicant's pan cleaner. The roller is seen to have a groove 370A adjacent one end thereof. The belt lays on the roller and has a ridge 372A dimensioned to seat into the groove. The combination of the ridge and groove tends to maintain the track of the belt on the roller so it does not wander back and forth.

FIGS. 15A through 15C illustrate an air tube 146 having a multiplicity of air jets (152) or nozzles threaded thereon. The air tube will be attached between the side walls and be provided with a source of compressed air in a manner known in the trade. It is seen that this particular embodiment of the air tube and jets has seven air nozzles, the air jets (nozzles) manufactured by Ex-Air, and threaded into the tube.

Before FIG. 16 is addressed, it is noted that the brushes of Applicant's pan cleaner are available from Fuller Brush and are made for commercial bakery pan cleaners. The available Fuller brush bun pan cleaner brushes are spiral-wound. They are not typically intended to "overlap" and, as illustrated in the previous embodiments set forth in this application, when a pair of rotating brushes are used, the brush tips do not overlap. Further, the available spiral-wound brushes tend to have a substantial gap between the bristle tips so that when the brushes spin, a bun inadvertently left in the pan could be missed by the gap between the brush tips.

With this in mind, FIG. 16 of Applicant's present invention illustrates an embodiment (154) which utilizes a pair of counter rotating brushes (156) which, instead of spiral-wound bristles, have bar-type bristles 158, the tips of which overlap as is clearly seen in the accompanying illustration. Bar-type brushes are available from Fuller. In the embodiment illustrated in FIG. 16, the brushes (also called "paddle wheel-type" brushes) are mounted so that the bristles intermesh and are further mounted so that the tips of bristles are close enough together to catch a bun that may have been inadvertently left in the pan.

The illustrated embodiment (154) also has a tapered hood (160) with side mounted baffles (162) and a centrally located vacuum port or duct (164), which is just above the center point between the two brushes. The net effect of meshing the brushes and tapering the hood is to make a smaller interior area and, given the same vacuum draw power, a stronger pressure gradient. That is, given the same motor for pulling the vacuum, the smaller area of air being drawn from, the stronger the vacuum. Applicant has done this by overlapping the paddle wheel brushes and tapering the hood.

Figure 18A:
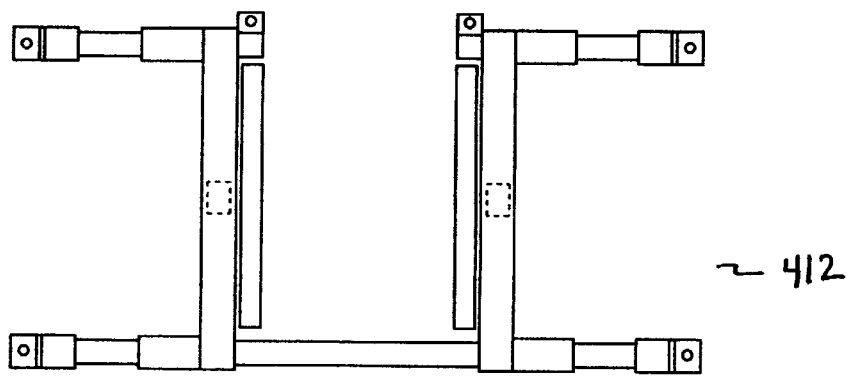
Figure 18B:
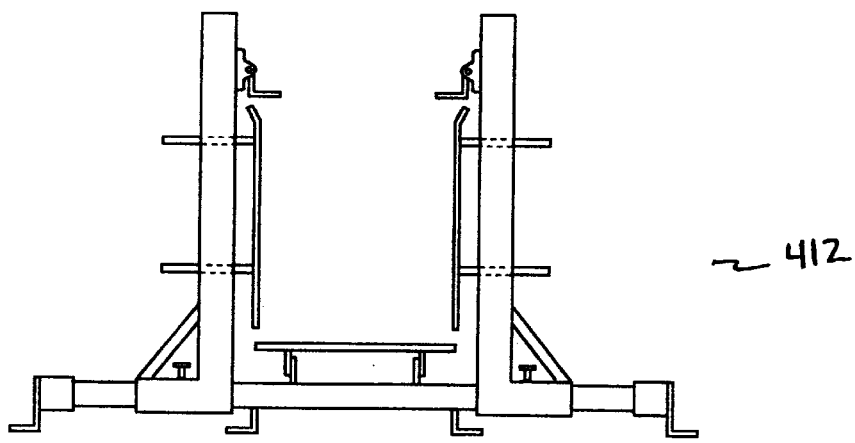
Figure 18C:
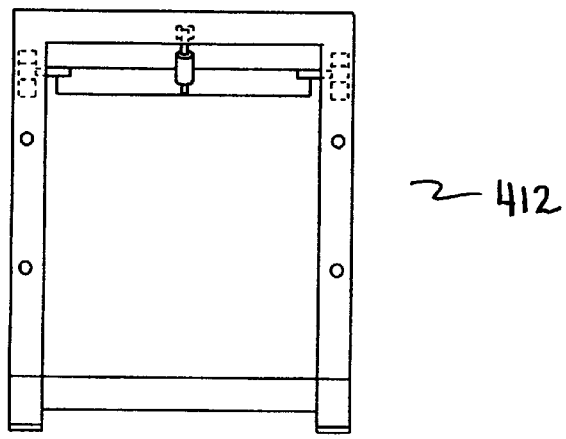

FIGS. 17A–B and 18 provide for a pan flipper 400 and cleaning brushes 402 to clean out a bakery pan. This is an entirely different approach than set forth in the preceding embodiment. This approach utilizes a pan "gripper and flipper" which will grab the leading edge of a pan and flip it over so it is upside down. The pan then will be caught between a guide 404 and rotating cleaning brushes, but, the pan being upside down, the debris and other matter dislodged by the cleaning brushes or gravity will fall into a catch pan 406 located beneath the conveyor, under the rotating cleaning brushes. As the pan moves out from the rotating brushes, it engages a second pan gripper/flipper 410 which catches the leading edge of the pan and rotates it over, so it is now right side up again, and either onto a conveyor or onto a stacker 412 (see FIG. 18).

The advantages of using an axle-mounted robotic flipper mounted on a hub 414 which is in turn mounted to a motor-driven axle 416 (see FIG. 17) is that no hood or vacuum is needed. The debris just falls under the impetus of gravity into the catch pan for disposal. Robotic grippers, and most of the components of this system, are available "off the shelf." For example, the rotating hub of the flipper/gripper can be timed by a PLC and a magnetic sensor with off-the-shelf components to provide necessary wiring and switching, or the components are easily fabricated. What is unique, however, is that the pan is turned upside down, cleaned by action of rotating brushes against the underside, with debris falling into a catch pan located beneath the cleaning brushes, and is then grabbed by a second flipper/gripper and rotated back right side up.

A depanner seed collector for use with baked goods is illustrated in the remaining figures. More specifically, an air blast depanner seed collector (166) where the air blast is controlled through a rotating turret having multiple sets of air jets mounted on it to control the air blast, the unit further containing augers to help sweep out the jet-blasted debris and a vacuum mounted on the hood of the unit for withdrawing airborne particles that don't settle in the augers.

Baked goods such as hamburger buns and bread, including those which have seeds on the surface of the goods, are baked in pans. The present invention (166) is designed to loosen the fresh baked buns or bread and assist in the depanning operation, and is also designed to collect seeds and other crumbs and dust on or around the panned product through the use of compressed air directed toward the product (typically buns or bread) while the product is beneath a hood. The present invention also provides for a hold down mechanism which is spring loaded urging a grid of bars against the baked goods so they don't blow out of the pan when the air jet blast occurs. The present invention further provides one or more augers to catch and remove some of the airborne debris. The present invention further provides for a pneumatically powered cylinder lift to tip up the unit for cleaning, inspection and any other reason.

The sidewalls and end walls of the unit may be quarter inch aluminum plates attached to form a rigid rectangle. The pneumatic lift is available from McMaster-Carr.

Figure 19:
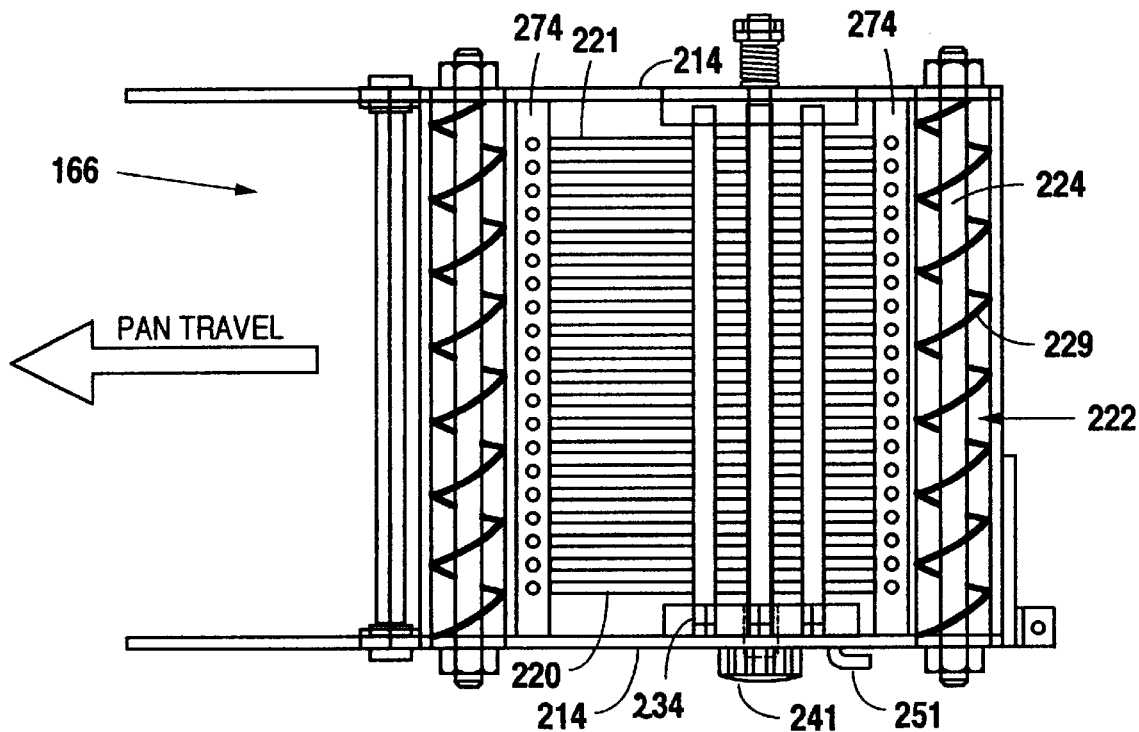
FIG. 19 and FIG. 20 illustrate top and side perspective views of Applicant's seed collector.
Figure 20:
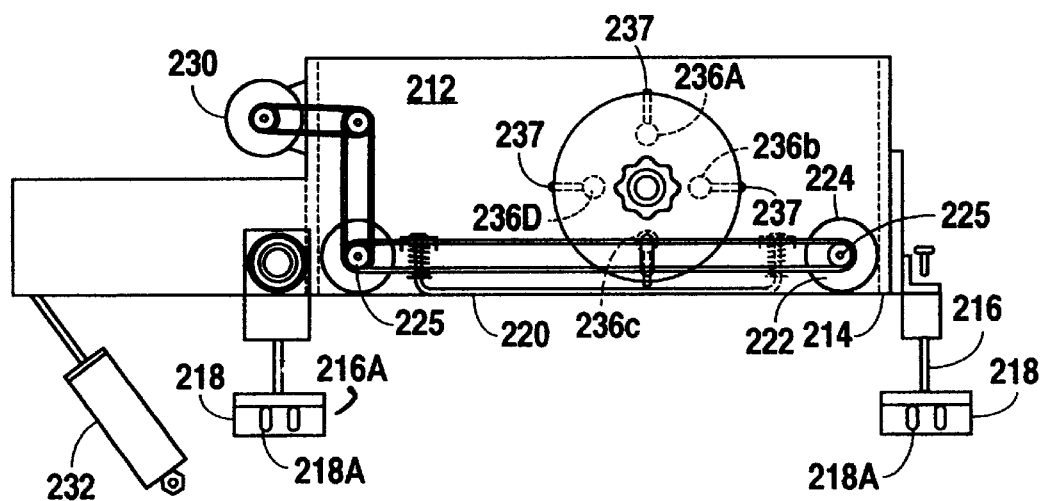

Specifically, FIGS. 19 and 20 illustrate a seed collector and depanner (166) having a hood 212 attached to frame members or sidewall members 214. The hood/frame unit sits on legs (216 and 216A) (typically four) which may include pneumatic, hydraulic, or mechanical height adjusters (218) to raise and lower the unit vertically similar to earlier embodiments. Legs (216A) (two, one on each side) are typically vertically fixed to the conveyor or other floor mounted support through the use of vertical slots (218A) with fasteners (not shown) therethrough. Part of the legs have a plate portion which may mount, through bearings or other means to the frame or hood, through a brace plate mounted stud which, when the pneumatic lift is operated, allows the entire unit to pivot about the stud and to be raised from its far end. This allows one to get underneath the frame/hood. It is shown in FIG. 20 that at the far end of the frame/hood is attached an angle brace which will rest on the removed (top) end of leg (216) with or without a pin and holes therethrough. If a pin is used it may easily be removed and then, with the angle brace just resting on the weight of the unit on the removed end of leg (216) activation of the pneumatic lift will raise the whole unit by pivoting it at the stud which is on either the sidewall of the unit and attach directly to the hood/frame of the seed collector or with the brace plate.

FIG. 19 is a top view with the top removed to show details of the interior of the unit. The unit is seen to have a grid system (220) which is comprised of spring-loaded, elongated members (212) biased downward by springs (223) (see FIGS. 20, 21, and 24A). These elongated members will contact the upper surface of the baked goods (such as buns) and, being spring loaded, gently urge them to maintain their position while the jets of air blast over them.

FIGS. 19 and 20 also illustrate the use of a pair of augers located adjacent either side of the grid. With reference to FIGS. 19, 20 and 21, it is seen that augers (222) include a screw (224) driven by sprocket (225), the screw laying in auger trough (228) so blades (229) of the screw are flush against the inner surface of the trough. When air blasts scatter seed, dust and other debris, some of it will float down over the auger trough and get swept by the auger screws to the end of the auger for collection, as set forth more fully below.

Auger sprockets (225) are driven by auger drive motor (230), which is shown here to be outside the hood walls to act as a counterweight when pneumatic lift (232) is activated to raise one end of the unit for cleaning and servicing.

Turning back to the top elevational view as represented by FIG. 19, it is also seen that located between the augers is a multiple position air jet turret (234) here, for the sake of illustration, having four tubes or manifolds 236A, 236B, 236C, and 236D on which are mounted a multiplicity of jets or nozzles (237). FIGS. 22A through 22F illustrate features of a multiple-position, spring-loaded air jet turret (234). Essentially, the spring-loaded turret rotates on a sidewall mounted, transverse central shaft (238) the ends of the shaft bearings articulated on the walls of the unit. Hubs, typically circular, are slidably attached at their origin to the shaft (238). Tension hub 240A is threaded to receive the removed ends of the four manifolds 236A, 236B, 236C, and 236D (see FIG. 22D) and the tension hub has a hole at the origin (center) to receive the removed end of shaft 238, with a tensioning spring (242) and a spring cap (244) used to urge the tension hub with the manifolds mounted thereto towards the near end or sealing hub (240B) of the air jet turret (234) as seen in FIG. 22A. At the seal hub, the near ends of the manifolds (236A–B) are seated in the hub with a shaft seal (246) to make an air-tight connection.

It is seen from FIGS. 22A, 22G, and 22F (as well as FIGS. 19, 24B and 24C) that the seal hub 240B is urged against housing or sidewall (214) in which shaft seal may be seated against mating seal (248) (typically spring loaded) mounted in housing wall. The two seals make an air-tight connection when the tensioning spring (242) urges the seal hub (240B) against the housing or hood (see FIG. 24B). On the outside of the housing is an air inlet (251) to connect to a compressor (not shown) with appropriate switching circuitry as is known in the art.

Positioning handle (241) allows turret (234) to be rotated by the user. Specifically, when positioning handle (241) is urged axially inward, it will move seal hub to the right as viewed in FIG. 24A to "unload" the seal hub and allow rotation of the turret. Rotation allows the user to select one of the four (or more) manifolds or air tubes to be positioned in the 6 o'clock position (as seen in FIG. 20), which position will allow an air blast to be directed downward on the baked goods in an effort to blast dust, loose seeds, crumbs, etc., in the air and either into the augers or up into the hood for vacuum discharge at vacuum discharge point (252) (see FIG. 23A).

Figure 23A:
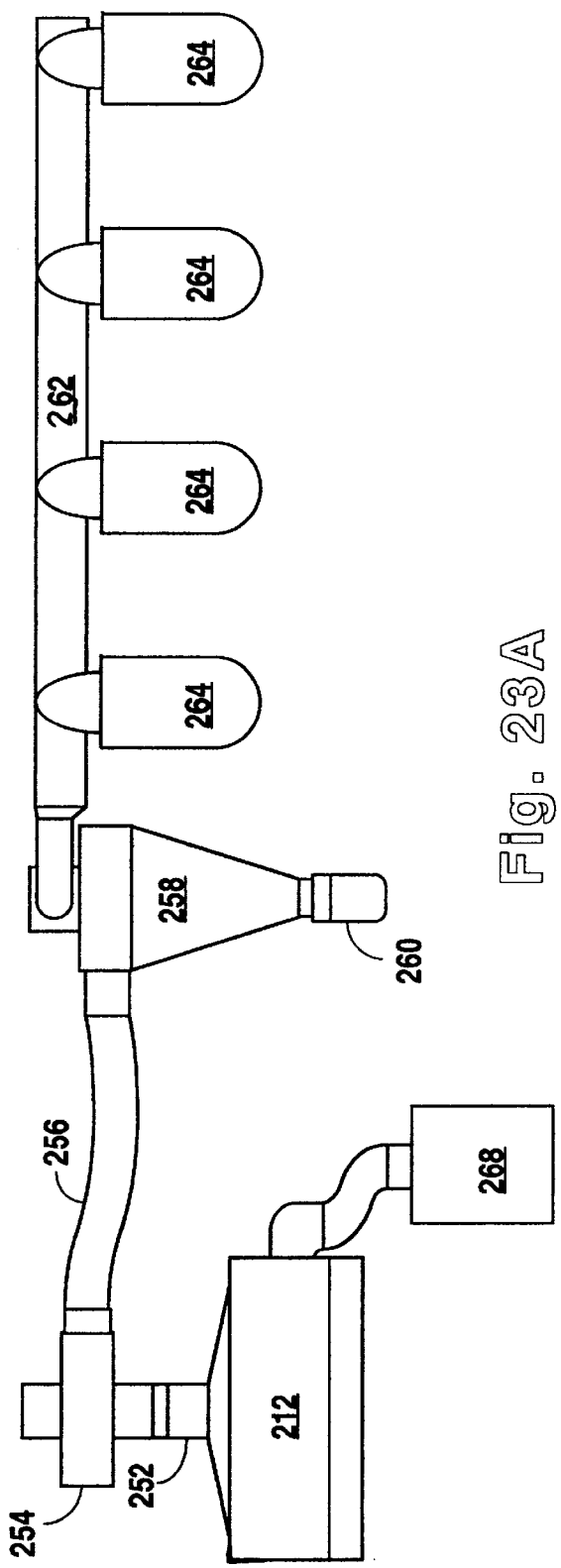
FIGS. 23A and 23B illustrate a top and side view of Applicant's seed collector.
Figure 23B:
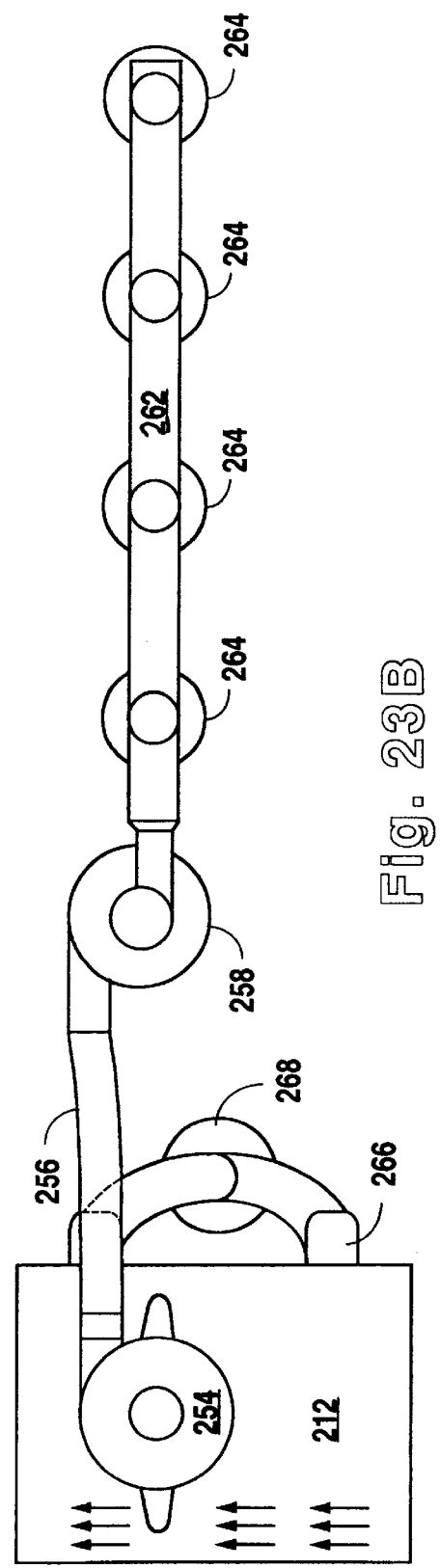

FIG. 23A also illustrates the use of blower (254) which will help suck up the loose dust, flour, etc., through vacuum discharge (252) and out blower through flex hose (256) into cyclone (258) where it will either fall out into filter collector (260) or continue through collector bag manifold/holder (262) for deposit into zippered bags (264). The collector (260) and bag (264) are emptied periodically.

Reference to FIG. 23A also illustrates the use of auger discharge ports (266) which dump material collected, typically seeds and other heavier particles, into auger discharge collection can (268).

FIGS. 24A and 24B illustrate the means in which grid (220) is comprised of a multiplicity of members or bars (221) which are spring loaded through the use of a multiplicity of springs (223) on either end of the bar, the spring mounted at one end to the bar and the second end biased against mounting brace (274), the braces (two) running transverse across the unit from one frame member to another (see FIG. 19).

The rotating turret may provide for anywhere from 4 to 10 or more manifolds, each with a different configuration of air nozzles. The selected configuration will match the arrangement of the molds in the pans to most effectively blast the goods.

The unit can loosen bread or buns in the pan to assist in the depanning operation. Since pan designs vary, the turret rotation will allow repositioning of air nozzles to match the pan design and bun arrangement. In prior art models, when the product is loosened by air, it tends to blow crumbs and seed in a wide area around the inlet to the depanner. In Applicants' system, the scrap material is gathered up and removed with an auger system and vacuum system for dust. The vacuum system is designed to keep the interior of the unit with a generally negative air pressure atmosphere. The unit is designed to straddle a magnetic belt conveyor, such as that manufactured by JAS Manufacturing Co., Inc., the JAS magnetic belt conveyor metering pans into the depanner.

The unit can be tilted up to service. The use of the hold-down grid to keep the product in the mold allows for proper depanning. The air blast air nozzle requires compressed air, preferably using "Exair" aspiration nozzles which use considerably less air than standard air nozzles.

An air solenoid is controlled by a proximity switch through a time delay relay circuit. This means, when there are no pans beneath the grid, there will be no air blast. The unit works for bun depanners, but may also be used for bun and bread depanners. The augers may be cast aluminum, welded stainless, or black iron. The unit may be used without the augers. The dimensions on the drawings are only suggested and are not intended to be limiting the invention to any specific dimension, the novelty of the invention residing, in part, in the structure and function and not its dimension. The details of the seed collector are sometimes usable with the depanner—such as the tilt mechanism and the adjustable legs.

FIG. 25 illustrates an alternate preferred embodiment of Applicant's auger. Martin Manufacturing manufactures a hard plastic "square" section auger that comes in pieces so it can be strung onto a shaft. One such piece is illustrated in FIG. 25. While the helical screw portion of the Martin auger sections is, of course, helical, it is mounted to a square section. Applicant inserts an electric motor into the center of the square section to drive the auger. Such electric motors are available from Interroll®.

Thus, Applicant provides an auger which comes in discreet sections which can be strung on an axle and also provides for inserting an electric motor used to drive the auger inside the center of the auger itself. The Interrol® motors are typically 24-volt DC and can be engaged to switches and mounters known in the trade. This type of auger may be used with both inventions.

What is claimed is:

1. A pan cleaner for removing debris from a baking surface of a baking pan, said baking pan carried by a conveyor belt into engagement with the pan cleaner, said pan cleaner comprising: at least one motor-driven brush for contacting a pan surface; a hood with vacuum means mounted thereto for removal of debris from said pan surface; at least one auger for collecting and removing of said debris from beneath said hood of said pan cleaner, and a motor for driving said auger.

2. The pan cleaner of claim 1, further including:

a frame for supporting the at least one motor driven brush, the hood, the at least one auger and the motor for driving the auger.

3. The pan cleaner of claim 2 further including:

air jets engaging the frame, for directing compressed air against the pan surface.

4. The pan cleaner of claim 3 further including means to raise and lower the frame with respect to the conveyor belt.

5. The pan cleaner of claim 2 wherein the at least one brush is attached to a plate for raising and lowering the brush with respect to the frame.

6. The pan cleaner of claim 2 further including means to pivot the frame with respect to the conveyor belt.

7. The pan cleaner of claim 2 wherein the frame includes adjustable legs for engagement with the conveyor belt.

8. The pan cleaner of claim 1 wherein the at least one motor driven brush includes a pair of brushes.

9. The pan cleaner of claim 4 wherein the pair of brushes are counter rotating.

10. The pan cleaner of claim 1 wherein the at least one motor driven brush and the least one auger are mounted transverse to a direction of travel of the pan on the conveyor belt.

11. The pan cleaner of claim 1 wherein the vacuum means of the hood includes at least one duct for carrying airborne debris from the beneath the hood.

12. The pan cleaner of claim 1 further including at least one baffle located adjacent to the at least one brush.

13. The pan cleaner of claim 1 wherein the at least one auger includes a pair of augers, each of the pair of augers including a helically wound member adjacent a trough.

14. The pan cleaner of claim 1 wherein the at least one motor driven brush is spiral wound.

* * * * *